United States Patent
Shimada

(10) Patent No.: US 10,122,891 B2
(45) Date of Patent: Nov. 6, 2018

(54) RECORDING DATA GENERATING APPARATUS, IMAGE RECORDING APPARATUS, RECORDING DATA GENERATING METHOD AND STORAGE MEDIUM

(71) Applicant: CANON KABUSHIKI KAISHA, Tokyo (JP)

(72) Inventor: Takuya Shimada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 15/271,329

(22) Filed: Sep. 21, 2016

(65) Prior Publication Data

US 2017/0099412 A1 Apr. 6, 2017

(30) Foreign Application Priority Data

Oct. 2, 2015 (JP) ................................. 2015-196914

(51) Int. Cl.
| | | |
|---|---|---|
| *H04N 1/40* | (2006.01) | |
| *H04N 1/405* | (2006.01) | |
| *H04N 1/60* | (2006.01) | |

(52) U.S. Cl.
CPC ....... *H04N 1/40068* (2013.01); *H04N 1/4052* (2013.01); *H04N 1/4058* (2013.01); *H04N 1/6008* (2013.01); *H04N 1/6069* (2013.01)

(58) Field of Classification Search
None
See application file for complete search history.

(56) References Cited

U.S. PATENT DOCUMENTS

2007/0115506 A1* 5/2007 Yada .................. H04N 1/40068
  358/3.06
2015/0138575 A1* 5/2015 Takamizawa ...... G03G 15/6585
  358/1.9

OTHER PUBLICATIONS

"Printing gloss effects in a 2.5D system" by Teun Baar; Sepideh Samadzadegan; Hans Brettel; Philipp Urban; Maria V. Ortiz Segovia—Published Feb. 24, 2014—(https://www.spiedigitallibrary.org/conference-proceedings-of-spie/9018/90180M/Printing-gloss-effects-in-a-25D-system/10.1117/12.2039792.full?SSO=1&tab=ArticleLinkFigureTable).*

(Continued)

*Primary Examiner* — Pawandeep Dhingra
(74) *Attorney, Agent, or Firm* — Carter, Deluca, Farrell & Schmidt LLP

(57) ABSTRACT

There is provided a recording data generating apparatus that generates recording data used for reproducing a gloss of an image by recording inclined structures on a recording medium, the recording data generating apparatus including: a conversion unit that converts gloss data with a first resolution having an inclined structure as one pixel into inclined structure data representing a combination ratio of a predetermined number of kinds of inclined structures; a halftone processing unit that generates N-value quantization data representing one of the predetermined number of kinds of inclined structures by performing a halftone process of the inclined structure data of each pixel with the first resolution, N being equal to the predetermined number of kinds; and a recording data generating unit that generates recording data used for recording one of the predetermined number of kinds of inclined structures for each pixel with the first resolution based on the quantization data.

16 Claims, 17 Drawing Sheets

(56) References Cited

OTHER PUBLICATIONS

"Reproducing oil paint gloss in print for the purpose of creating reproductions of Old Masters" by Willemijn S. Elkhuizen; Boris A. J. Lenseigne; Teun Baar; Wim Verhofstad; Erik Tempelman; Jo M. P. Geraedts; Joris Dik—Published Mar. 13, 2015—(https://www.spiedigitallibrary.org/conference-proceedings-of-spie/9398/93980W/Reproducing-oil-paint-gl).*

Yanxiang Lan et al., "Bi-Scale Appearance Fabrication", Transaction on Graphics, vol. 32, No. 4, Article 145, 2013, pp. 1-11.

* cited by examiner

| 0.7K1<br>+0.3K2 | 0.6K1<br>+0.4K2 | 0.1K1<br>+0.9K2 | |
|---|---|---|---|
| 0.1K1<br>+0.9K2 | 0.1K1<br>+0.9K2 | 0.4K1<br>+0.6K2 | |
| 0.1K1<br>+0.9K2 | 0.8K1<br>+0.2K2 | 0.6K1<br>+0.4K2 | |
| | | | |

FIG.4A

| K1 | K1 | K2 | |
|---|---|---|---|
| K2 | K2 | K2 | |
| K2 | K1 | K1 | |
| | | | |

| K1 | K2 | K2 | |
|---|---|---|---|
| K2 | K2 | K1 | P_2_3 |
| K2 | K1 | K2 | P_3_3 |
| | | | |

FIG.4C

| gloss' | haze' | INCLINED STRUCTURE 1 | INCLINED STRUCTURE 2 | ... | INCLINED STRUCTURE 6 | ... | INCLINED STRUCTURE 10 | ... | INCLINED STRUCTURE 18 | ... | INCLINED STRUCTURE 41 |
|---|---|---|---|---|---|---|---|---|---|---|---|
| gloss_1 | haze_1 | 1 | 0 | ... | 0 | ... | 0 | ... | 0 | ... | 0 |
| gloss_2 | haze_2 | 0.9 | 0.05 | ... | 0.05 | ... | 0 | ... | 0 | ... | 0 |
| gloss_3 | haze_3 | 0.8 | 0.06 | ... | 0.06 | ... | 0 | ... | 0 | ... | 0 |
| ⋮ | ⋮ | ⋮ | ⋮ | | ⋮ | | ⋮ | | ⋮ | | ⋮ |
| gloss_i | haze_i | 0.7 | 0.3 | ... | 0 | ... | 0.04 | ... | 0.04 | ... | 0 |
| ⋮ | ⋮ | ⋮ | ⋮ | | ⋮ | | ⋮ | | ⋮ | | ⋮ |

FIG.10

| ID \ (m,n) | (1,1) | (1,2) | ... | (1,4) | (2,1) | ... | (4,4) |
|---|---|---|---|---|---|---|---|
| INCLINED STRUCTURE 1 | NUMBER OF LAMINATIONS 1_1_1 | NUMBER OF LAMINATIONS 1_1_2 | ... | NUMBER OF LAMINATIONS 1_1_4 | NUMBER OF LAMINATIONS 1_2_1 | ... | NUMBER OF LAMINATIONS 1_4_4 |
| INCLINED STRUCTURE 2 | NUMBER OF LAMINATIONS 2_1_1 | NUMBER OF LAMINATIONS 2_1_2 | ... | NUMBER OF LAMINATIONS 2_1_4 | NUMBER OF LAMINATIONS 2_2_1 | ... | NUMBER OF LAMINATIONS 2_4_4 |
| ... | ... | ... | ... | ... | ... | ... | ... |
| INCLINED STRUCTURE 41 | NUMBER OF LAMINATIONS 41_1_1 | NUMBER OF LAMINATIONS 41_1_2 | ... | NUMBER OF LAMINATIONS 41_1_4 | NUMBER OF LAMINATIONS 41_2_1 | ... | NUMBER OF LAMINATIONS 41_4_4 |

FIG.12

|    | 1   | 2   | 3   | 4   | 5   | 6   | 7   | 8   | 9   | 10  | 11  | 12  | 13  | 14  | 15  | 16  |
|----|-----|-----|-----|-----|-----|-----|-----|-----|-----|-----|-----|-----|-----|-----|-----|-----|
| 1  | 1   | 193 | 49  | 241 | 13  | 205 | 61  | 253 | 4   | 196 | 52  | 244 | 16  | 208 | 64  | 255 |
| 2  | 129 | 65  | 177 | 113 | 141 | 77  | 189 | 125 | 132 | 68  | 180 | 116 | 144 | 80  | 192 | 128 |
| 3  | 33  | 225 | 17  | 209 | 45  | 237 | 29  | 221 | 36  | 228 | 20  | 212 | 48  | 240 | 32  | 224 |
| 4  | 161 | 97  | 14  | 81  | 173 | 109 | 157 | 93  | 164 | 100 | 148 | 84  | 176 | 112 | 160 | 96  |
| 5  | 9   | 201 | 201 | 249 | 5   | 197 | 53  | 245 | 12  | 204 | 60  | 252 | 8   | 200 | 56  | 248 |
| 6  | 137 | 73  | 73  | 121 | 133 | 69  | 181 | 117 | 140 | 76  | 188 | 124 | 136 | 72  | 184 | 120 |
| 7  | 41  | 233 | 233 | 217 | 37  | 229 | 21  | 213 | 44  | 236 | 28  | 220 | 40  | 232 | 24  | 216 |
| 8  | 169 | 105 | 105 | 89  | 165 | 101 | 149 | 85  | 172 | 108 | 156 | 92  | 168 | 104 | 152 | 88  |
| 9  | 3   | 195 | 195 | 243 | 15  | 207 | 63  | 255 | 2   | 194 | 50  | 242 | 14  | 206 | 62  | 254 |
| 10 | 131 | 67  | 67  | 115 | 143 | 79  | 191 | 127 | 130 | 66  | 178 | 114 | 142 | 78  | 190 | 126 |
| 11 | 35  | 227 | 227 | 211 | 47  | 239 | 31  | 223 | 34  | 226 | 18  | 210 | 46  | 238 | 30  | 222 |
| 12 | 163 | 99  | 99  | 83  | 175 | 111 | 159 | 95  | 162 | 98  | 146 | 82  | 174 | 110 | 158 | 94  |
| 13 | 11  | 203 | 203 | 251 | 7   | 199 | 55  | 247 | 10  | 202 | 58  | 250 | 6   | 198 | 54  | 246 |
| 14 | 139 | 75  | 75  | 123 | 135 | 71  | 183 | 119 | 138 | 74  | 186 | 122 | 134 | 70  | 182 | 118 |
| 15 | 43  | 235 | 235 | 219 | 39  | 231 | 23  | 215 | 42  | 234 | 26  | 218 | 38  | 230 | 22  | 214 |
| 16 | 171 | 107 | 107 | 91  | 167 | 103 | 151 | 87  | 170 | 106 | 154 | 90  | 166 | 102 | 150 | 86  |

FIG.14

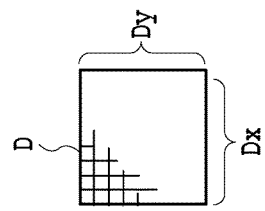
FIG.15B
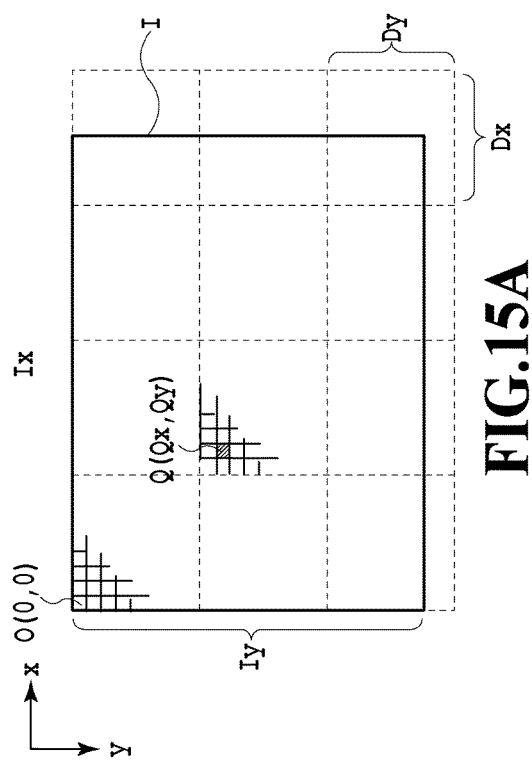
FIG.15A
FIG.15C

RECORDING DATA GENERATING APPARATUS, IMAGE RECORDING APPARATUS, RECORDING DATA GENERATING METHOD AND STORAGE MEDIUM

BACKGROUND OF THE INVENTION

Field of the Invention

The present invention relates to printing for improving design and relates to a technology for reproducing a variable reflection characteristic in which a printed matter has a different visual performance in accordance with an observation direction.

Description of the Related Art

In recent years, researches for controlling reflection characteristics of printed images have progressed, and there are movements for improving the design of printed matter by controlling a gloss distribution and the like. Among them, as a technology for reproducing angle dependency of reflectivity, in other words, a variable reflection characteristic, there is "Xin Tong et al., Bi-Scale Appearance Fabrication, Transaction on Graphics, Vol. 32, No. 4, Article 145, 2013". "Xin Tong et al., Bi-Scale Appearance Fabrication, Transaction on Graphics, Vol. 32, No. 4, Article 145, 2013" discloses a recording method for reproducing a variable reflection characteristic by recording a minute inclined structure on the surface of an image. More specifically, by associating input gloss data with a plurality of inclined structure sets, the variable reflection characteristic is controlled.

SUMMARY OF THE INVENTION

However, in the method disclosed in "Xin Tong et al., Bi-Scale Appearance Fabrication, Transaction on Graphics, Vol. 32, No. 4, Article 145, 2013", since the size of an inclined structure set recorded for reproducing the variable reflection characteristic is large, there is a problem in that the spatial resolution is low in controlling the variable reflection characteristic. In addition, generally, since the kinds of inclined structures that can be recorded in a minute area are limited in an image recording apparatus, there is a problem in that the number of tone levels is small.

An object of the present invention is to generate pattern data capable of reproducing a variable reflection characteristic of an image with high resolution and a high tone level.

According to the present invention, there is provided a recording data generating apparatus that generates recording data used for reproducing a gloss of an image by recording inclined structures on a recording medium, the recording data generating apparatus including: a conversion unit that converts gloss data with a first resolution having an inclined structure as one pixel into inclined structure data representing a combination ratio of a predetermined number of kinds of inclined structures; a halftone processing unit that generates N-value quantization data representing one of the predetermined number of kinds of inclined structures by performing a halftone process of the inclined structure data of each pixel with the first resolution, N being equal to the predetermined number of kinds; and a recording data generating unit that generates recording data used for recording one of the predetermined number of kinds of inclined structures for each pixel with the first resolution based on the quantization data.

Further features of the present invention will become apparent from the following description of exemplary embodiments (with reference to the attached drawings).

BRIEF DESCRIPTION OF THE DRAWINGS

FIG. 4A is a diagram that illustrates a method of determining an inclined structure of pixels according to the first embodiment;

FIG. 4B is a diagram that illustrates a method of determining an inclined structure of pixels according to the first embodiment;

FIG. 4C is a diagram that illustrates a method of determining an inclined structure of pixels according to the first embodiment;

FIG. 10 is a schematic diagram that illustrates an example of an inclined structure table according to the first embodiment;

FIG. 12 is a schematic diagram that illustrates an example of a pattern profile according to the first embodiment;

FIG. 14 is a diagram that illustrates a dither matrix used by an inclined structure halftone processing unit according to a third embodiment;

FIG. 15A is a schematic diagram that illustrates a method of acquiring a value of a dither matrix corresponding to a pixel of interest in an inclined structure halftone processing unit according to the third embodiment;

FIG. 15B is a schematic diagram that illustrates a method of acquiring a value of a dither matrix corresponding to a pixel of interest in an inclined structure halftone processing unit according to the third embodiment;

FIG. 15C is a schematic diagram that illustrates a method of acquiring a value of a dither matrix corresponding to a pixel of interest in an inclined structure halftone processing unit according to the third embodiment;

DESCRIPTION OF THE EMBODIMENTS

Figure 1A:
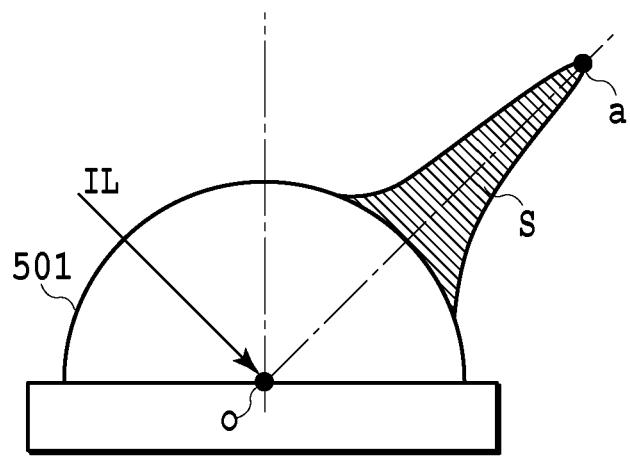
FIG. 1A is a schematic diagram that illustrates a variable reflection characteristic.

Hereinafter, embodiments of the present invention will be described with reference to the drawings. The embodiments described below are not for the purposes of limiting the present invention, and it cannot be determined that a combination of all the features described in the embodiments are essential for a solving means of the present invention. A same reference numeral will be assigned to the same configuration for description.

First Embodiment (Control of Variable Reflection Characteristic)

Figure 1B:
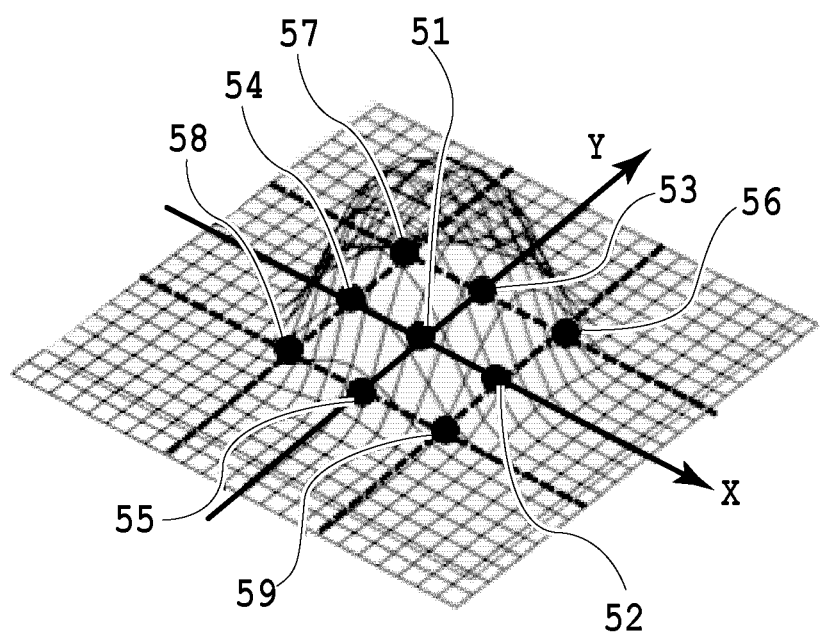
FIG. 1B is a schematic diagram that illustrates a variable reflection characteristic.

FIGS. 1A and 1B are schematic diagrams that illustrate a variable reflection characteristic.

FIG. 1A illustrates an example of a variable reflection characteristic of a plane (hereinafter, referred to as a first plane) that includes an incident ray vector and a normal-line vector of a reflection surface. An arrow IL represents the direction of an incident ray. A curved line 501 represents reflectivity of reflected light for each direction. For example, the length of a segment oa represents the reflectivity of light reflected in a direction from a point o to a point a. Here, light reflected in the direction from the point o to the point a is specular reflection light. Typically, reflected light can be divided into a diffused reflection light component not along a direction and a surface reflection light component (a shaded portion S), and a gloss mainly relates to the surface reflection component.

FIG. 1B is a schematic diagram that illustrates a variable reflection characteristic of the surface reflection component. An X axis represents an angle formed by a reflected light vector and a ray vector of specular reflection light (a vector from the point o to the point a illustrated in FIG. 1A) on the first plane. A Y axis represents an angle formed by the reflected light vector and the ray vector of the specular reflection light on a plane (hereinafter, referred to as a second plane) that is perpendicular to the first plane and includes the ray vector of the specular reflection light. In addition, a Z axis represents reflectivity in a direction represented by values of the X axis and the Y axis. For example, a point 51 (X=Y=0) corresponds to a specular reflection direction, and a value of the Z axis thereof represents the reflectivity of the specular reflection direction. Generally, surface reflection components of reflected light are three-dimensionally distributed on the periphery of the specular reflection direction.

An image recording apparatus according to this embodiment records an image such that the variable reflection characteristic illustrated in FIG. 1B matches a characteristic represented by input gloss data. The control of the variable reflection characteristic is performed by recording a plurality of minute inclined structures having mutually-different normal line directions at an appropriate ratio. In other words, the variable reflection characteristic is controlled based on a distribution of plane normal lines of inclined structures. Hereinafter, the principle will be described.

Figure 2:
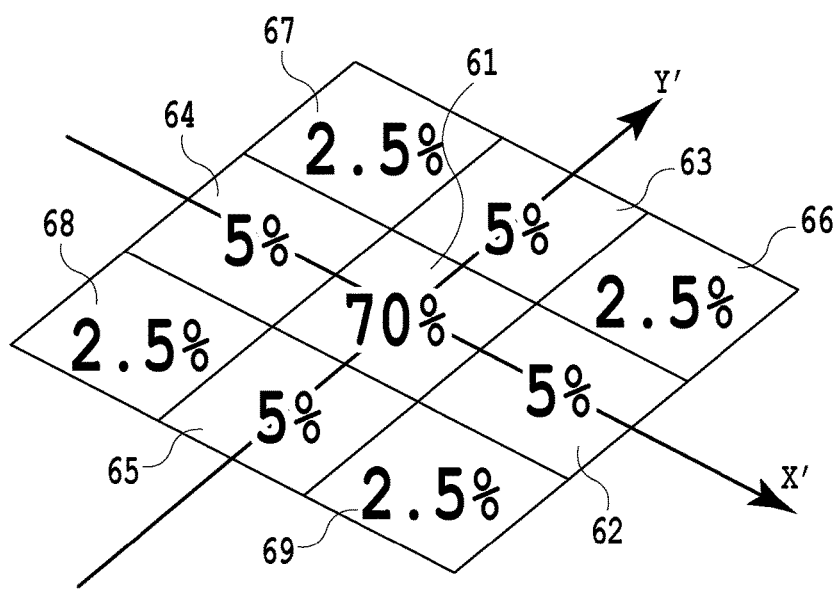
FIG. 2 is a schematic diagram that illustrates a method of controlling a variable reflection characteristic according to a first embodiment.

FIG. 2 is a schematic diagram that illustrates a method of controlling a variable reflection characteristic according to this embodiment. In FIG. 2, an example of a distribution of plane normal lines of a plurality of minute plane elements configuring a predetermined area of an image surface is illustrated. Values of the X' axis and the Y' axis disposed at center positions of blocks 61 to 69 represent normal-line directions, and the value of each block is a ratio of minute plane elements having a normal-line direction of the block in the predetermined area. In FIG. 2, the direction of reflected light reflected from minute plane elements corresponding to each block corresponds to the X axis and the Y axis illustrated in FIG. 1B. For example, surface reflection light reflected from minute plane elements corresponding to the block 61 is reflected in a direction corresponding to the point 51 illustrated in FIG. 1B. Similarly, surface reflection light reflected from minute plane elements corresponding to the blocks 62 to 69 is reflected in directions corresponding to the points 52 to 59 illustrated in FIG. 1B.

Accordingly, in a case where the distribution of plane normal-lines of inclined structures is the distribution illustrated in FIG. 2, surface reflection light reflected from 70% of the minute plane elements travels in a direction corresponding to the point 51 illustrated in FIG. 1B. In addition, surface reflection light reflected from 5% of the minute plane elements travels in a direction corresponding to the points 52 to 55 illustrated in FIG. 1B, and surface reflection light reflected from 2.5% of the minute plane elements travels in a direction corresponding to the points 56 to 59 illustrated in FIG. 1B. As a result, an image having the distribution of the plane normal-lines illustrated in FIG. 2 represents a variable reflection characteristic in which the reflectivity of the direction corresponding to the points 52 to 55 is 5/70 times of the reflectivity of the direction corresponding to the point 51 and is 5/2.5 times of the reflectivity of the direction corresponding to the points 56 to 59.

In this way, the variable reflection characteristic of the surface reflection component is associated with the distribution of plane normal lines and can be controlled by recording a plurality of minute inclined structures having mutually-different normal-line directions at an appropriate ratio on the image surface. Next, a method of recording minute inclined structures will be described.

Figure 3A:
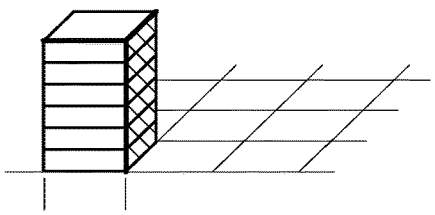
FIG. 3A is a schematic diagram that illustrates a method of recording an inclined structure according to the first embodiment.
Figure 3B:
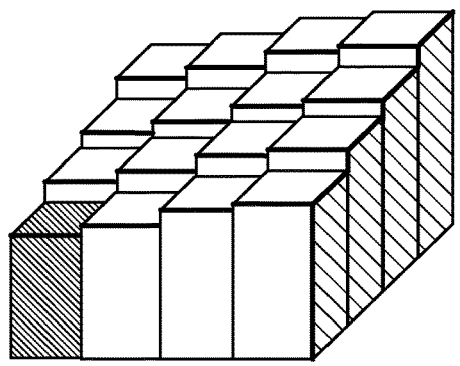
FIG. 3B is a schematic diagram that illustrates a method of recording an inclined structure according to the first embodiment.
Figure 3C:
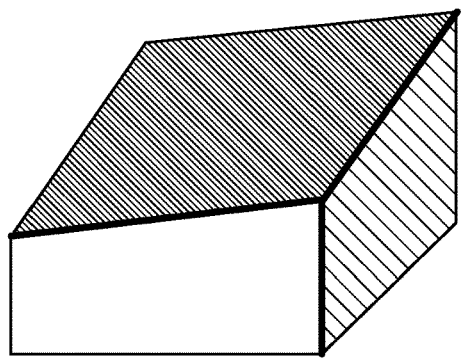
FIG. 3C is a schematic diagram that illustrates a method of recording an inclined structure according to the first embodiment.

FIGS. 3A to 3C are schematic diagrams that illustrate a method of recording an inclined structure according to this embodiment. First, as illustrated in FIG. 3A, laminating recording of a pattern recording material is performed. Then, as illustrated in FIG. 3B, an inclined structure including a predetermined inclined face as illustrated in FIG. 3C is formed by using a plurality of recording pixels recorded in accordance with a lamination number that is appropriately set. In the example illustrated in FIGS. 3A to 3C, the inclined structure is configured using a total of 16 recording pixels of vertical four recording pixels×horizontal four recording pixels. Finally, the pattern recording material is recorded so as to smooth the outermost surface. In the sequence described above, as illustrated in FIG. 3C, an inclined structure including an inclined face (shaded portion) formed by a single plane is formed. The recording pixel forms a unit area corresponding to the resolution of the image recording apparatus. Hereinafter, a unit area of the inclined structure configured by a plurality of recording pixels illustrated in FIG. 3C will be referred to simply as a "pixel".

In a general image recording apparatus, the kinds of inclined structure that can be recorded in a minute area are limited. For this reason, the number of tone levels of the variable reflection characteristic that can be reproduced is limited as well. In order to increase the number of tone levels of the variable reflection characteristic, the size of the inclined structure needs be large. However, in a case where the size of the inclined structure is large, the spatial resolution (control resolution of the variable reflection characteristic) is decreased. For example, in a case where one kind of inclined structure is configured using four recording pixels×four recording pixels as illustrated in FIG. 3C, and one type of variable reflection characteristic is reproduced using an inclined structure set configured by 5×5 inclined structures, 20 recording pixels×20 recording pixels are necessary for the reproduction of the variable reflection characteristic. The control resolution of the variable reflection characteristic is 1/20 of the recording resolution of the image recording apparatus.

In the image recording apparatus according to this embodiment, by reproducing the variable reflection characteristic by using not an inclined structure set but the inclined structure as illustrated in FIG. 3C as a control unit, a decrease in the control resolution of the variable reflection characteristic can be avoided. Here, while the kind of inclined structure that can be configured using four recording pixels×four recording pixels as illustrated in FIG. 3B is limited, in the image recording apparatus according to this embodiment, the number of tone levels of the variable reflection characteristic that can be reproduced is substantially increased by a halftone process using an error diffusion method. More specifically, the image recording apparatus according to this embodiment determines a combination of a plurality of recordable inclined structures corresponding to gloss data such that the variable reflection characteristic matches a characteristic represented by the input gloss data and generates inclined structure data representing the ratio of the combination of the plurality of inclined structures. By performing a halftone process for the generated inclined structure data, an inclined structure among the plurality of inclined structures that is to be recorded is determined. In this way, for example, a variable reflection characteristic that is similar to a characteristic of a case where an inclined structure 1 is recorded at a ratio of 0.7, and an inclined structure 2 is recorded at a ratio of 0.3 can be reproduced.

FIGS. 4A to 4C are diagrams that illustrate methods of determining an inclined structure of pixels according to this embodiment. In this embodiment, for example, the inclined structure as illustrated in FIG. 3C is set as one pixel, and the variable reflection characteristic is controlled for each pixel. For simplification, an example will be described in which inclined structures that can be formed are two kinds of K1 and K2. FIG. 4A illustrates inclined structure data corresponding to gloss data for each pixel. FIG. 4B illustrates a case where an inclined structure having a highest combination ratio in the inclined structure data for each pixel is determined as an inclined structure formed in the pixel without performing the inclined structure halftone process according to this embodiment. FIG. 4C illustrates a case where an inclined structure formed in a pixel is determined according to the inclined structure halftone process of this embodiment, and, the inclined structures of pixels P_1_2, P_2_3, and P_3_3 are different from those of the case illustrated in FIG. 4B.

In the halftone process using the error diffusion method according to this embodiment, an inclined structure formed in a pixel is determined based on the inclined structure data of the pixel and the inclined structure data of the peripheral pixels thereof. More specifically, the inclined structure of a pixel of interest is determined such that a difference between inclined structure data generated based on input gloss data and inclined structure data corresponding to the determined inclined structure is set as error data, and a total sum of the error data of peripheral pixels of the pixel of interest is minimized. The error data of the pixel of interest is further diffused to the peripheral pixels. In this way, the variable reflection characteristic of the pixel of interest is not reproduced according to only the inclined structure of the pixel of interest but reproduced according to the inclined structures of the pixel of interest and the peripheral pixels. As a result, the substantial number of tone levels can be increased without decreasing the spatial resolution.

(Schematic Configuration of Image Recording Apparatus)

Figure 5:
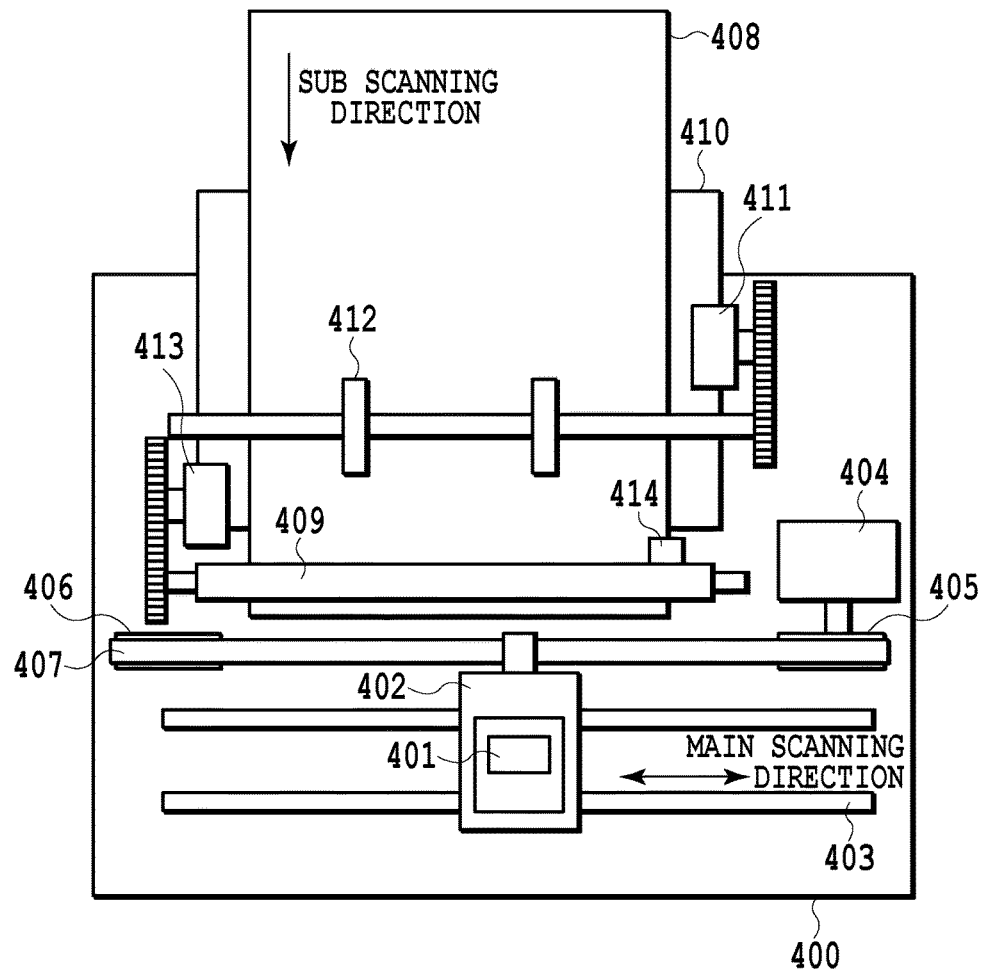
FIG. 5 is a diagram that schematically illustrates an example of an image recording apparatus that can be applied to the first embodiment.

FIG. 5 is a diagram that schematically illustrates an example of an image recording apparatus that can be applied to this embodiment. An image recording apparatus 400 is an ink jet recording apparatus that performs image recording using ink.

A head cartridge 401 includes: a recording head configured by a plurality of discharge openings; and an ink tank supplying ink to this recording head. The head cartridge 401 is positioned and mounted to be replaceable in a carriage 402, and the carriage 402 can reciprocate along a guide shaft 403. More specifically, the carriage 402 is driven by a main scanning motor 404 as a drive source through driving mechanisms such as a motor pulley 405, a driven pulley 406, and a timing belt 407, and the position and the movement thereof are controlled. Here, a movement of the carriage 402 along the guide shaft 403 will be referred to as "main scanning", and the direction of the movement thereof will be referred to as a "main scanning direction".

Recording media 408 such as print sheets are placed in an automatic sheet feed (hereinafter, referred to as an "ASF") 410. When an image is recorded, a pickup roller 412 is rotated through a gear by driving a sheet feed motor 411, and recording media 408 are separated and fed from the ASF 410 one at each time. In addition, the recording medium 408 is conveyed to a record start position facing a discharge opening face of the head cartridge 401 disposed on the carriage 402 in accordance with the rotation of a conveyance roller 409. The conveyance roller 409 is driven by a line feed (LF) motor 413 as a driving source through a gear. A determination of whether the recording medium 408 is fed and a determination of a sheet feed position are performed at a time point when the recording medium 408 passes through an end sensor 414.

The head cartridge 401 mounted in the carriage 402 is configured by: an ink tank storing ink as a recording material; a recording head discharging ink supplied from the ink tank in accordance with discharge data; and an ultraviolet emitting device. The recording head is maintained such that the discharge opening face of ink protrudes to the lower side from the carriage 402 and is parallel to the recording medium 408.

For example, there are six kinds of ink including yellow (Y), magenta (M), cyan (C), black (K), a roughness forming material 1 (W), and a roughness forming material 2 (S). The ink W, for example, is white ultraviolet curable ink. The ink W landing on a recording medium is cured in accordance with the emission of an ultraviolet ray from an ultraviolet emitting device and is used for recording an inclined structure on the recording medium. The color ink of Y, M, C, and K, for example, is pigment ink, and, after an inclined structure is recorded using the ink W, colors are reproduced using a combination of ink of four kinds. The ink S, for example, is colorless transparent ultraviolet curable ink and is discharged onto an outermost surface on a color image recorded using color ink. The ink S landed on the recording medium is cured in accordance with the emission of an ultraviolet ray from the ultraviolet emitting device and forms a smooth inclined face on the surface of the inclined structure.

Next, the recording operation of the image recording apparatus 400 will be described. First, when a recording medium 408 is conveyed to a predetermined record start position, the carriage 402 moves above the recording medium 408 along the guide shaft 403, and ink is discharged from the discharge openings of the recording head at the time of the movement. Then, when the carriage 402 moves up to one end of the guide shaft 403, the conveyance roller 409 conveys the recording medium 408 by a predetermined amount in a direction perpendicular to the scanning direction of the carriage 402. The conveyance of this recording medium 408 is called "sheet conveyance" or "sub scanning", and the conveyance direction is called a "sheet conveyance direction" or a "sub scanning direction". When the conveyance of the recording medium 408 for the predetermined amount ends, the carriage 402 moves along the guide shaft 403 again. In this way, by repeating the scanning using the carriage 402 of the recording head and the sheet conveyance, an image is recorded on the whole recording medium 408.

The image recording apparatus according to this embodiment records an image in three steps of recording an inclined structure of a lower base, recording of colors, and recording of an inclined structure of the outermost surface. The inclined structure of the lower base is formed by discharging the ink W to be laminated. Every time when the recording of one layer is completed, the recording medium 408 is returned to the record start position by reversely rotating the conveyance roller 409, and the process is moved to the recording of a next layer. When recording of all the layers is completed, and the formation of the inclined structure is completed, the process is moved to the recording of colors. At last, the ink S is discharged, whereby a smooth inclined face is formed on the surface of the inclined structure.

(Hardware Configuration of Image Recording System)

Figure 6:
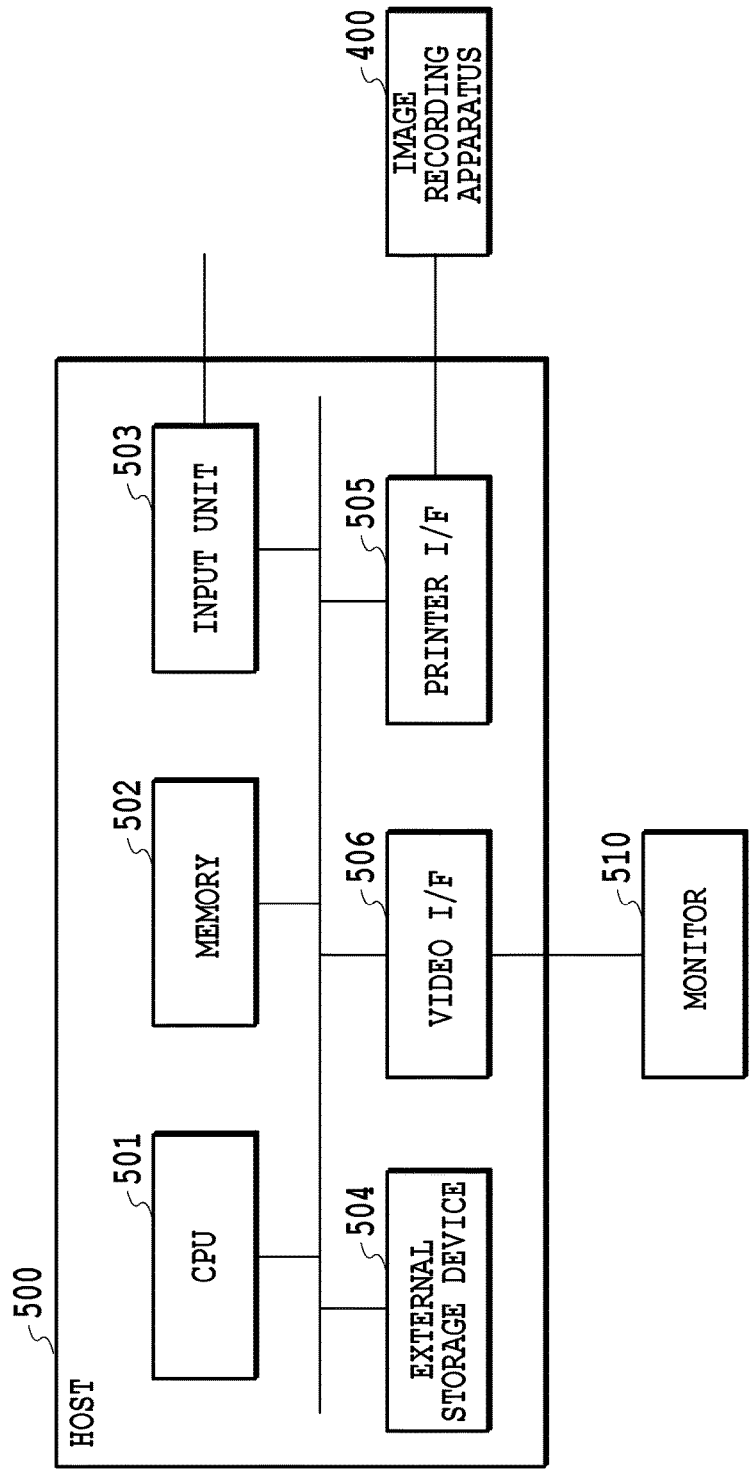
FIG. 6 is a block diagram that illustrates the hardware configuration of an image recording system according to the first embodiment.

FIG. 6 is a block diagram that illustrates the hardware configuration of an image recording system according to this embodiment. As illustrated in FIG. 6, the image recording system includes a host 500 and an image recording apparatus 400.

The host 500 as an image processing unit, for example, is a computer and includes a microprocessor (CPU) 501 and a memory 502 such as a random access memory (RAM). In addition, the host 500 includes: an input unit 503 such as a keyboard; and an external storage device 504 such as a hard disk drive. The host 500 further includes: a communication interface (hereinafter, referred to as a "printer I/F") 505 for communicating with the image recording apparatus 400; and a communication interface (hereinafter, referred to as a "video I/F") 506 for communicating with a monitor 510.

The CPU 501 performs various processes in accordance with a program stored in the memory 502 and performs a process relating to image processing according to this embodiment. Such a program may be stored in the external storage device 504 or be supplied from an external device not illustrated in the drawing. In addition, the host 500 outputs various kinds of information to the monitor 510 through the video I/F 506 and receives various kinds of information through the input unit 503. Furthermore, the host 500 is connected to the image recording apparatus 400 through the printer I/F 505, transmits ink discharge data, for which image processing has been performed, to the image recording apparatus 400 for recording, and receives various kinds of information from the image recording apparatus 400.

In this embodiment, while the image processing unit is configured in the host 500, the image processing unit may be configured in the image recording apparatus 400. Alternatively, the image processing unit may be configured as a recording data generating apparatus that can communicate with the host 500 and the image recording apparatus 400.

(Functional Configuration Relating to Image Processing)

Figure 7:
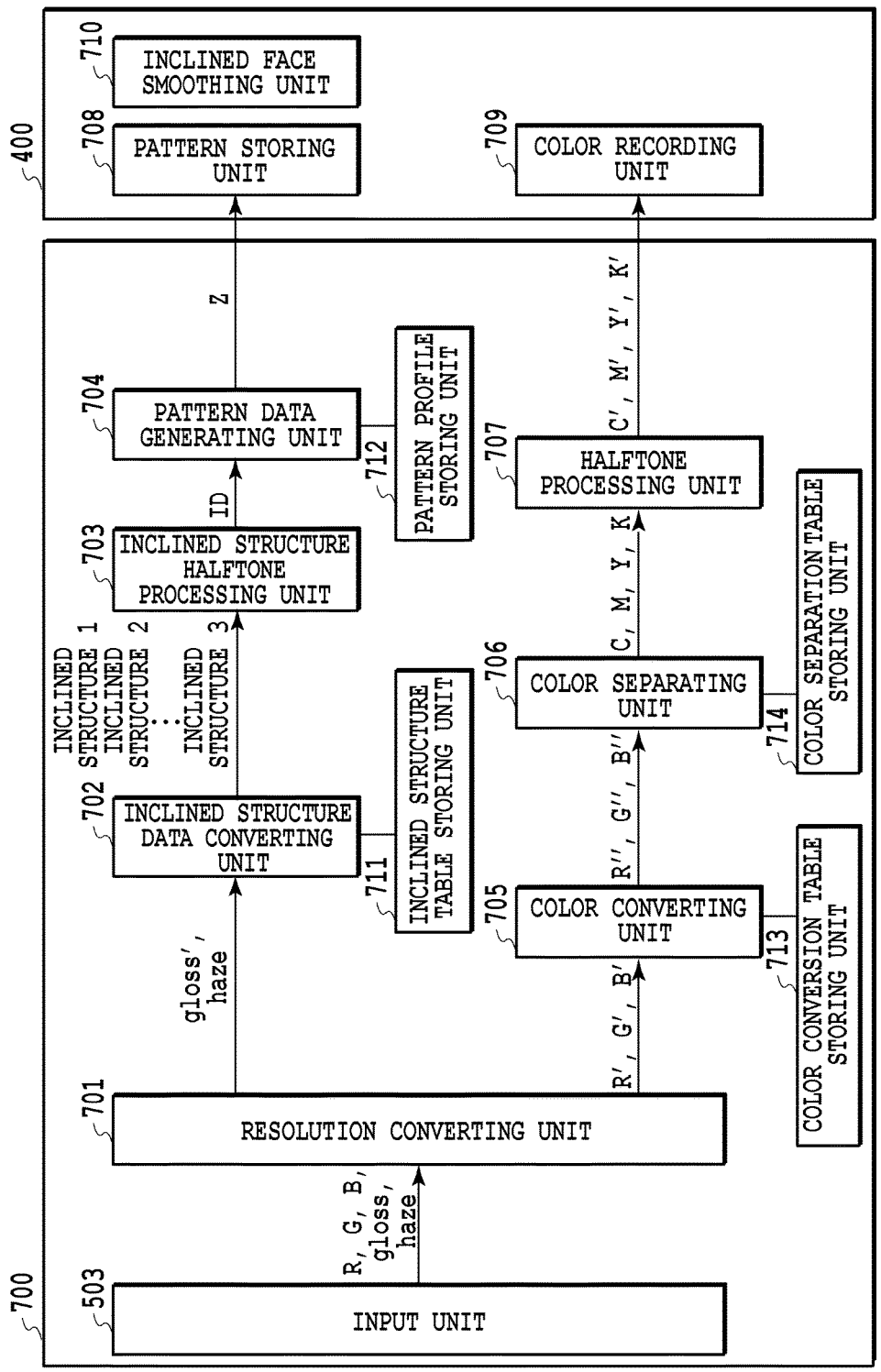
FIG. 7 is a block diagram that illustrates the functional configuration according to image processing of the first embodiment.

FIG. 7 is a block diagram that illustrates the functional configuration according to image processing of this embodiment.

The input unit 503 inputs color data (R, G, B) and gloss data (gloss, haze).

A resolution converting unit 701 converts the resolution of input image data. The color data is converted into the recording resolution of the image recording apparatus 400. The gloss data is converted into the data with a resolution having one inclined structure as one pixel.

An inclined structure data converting unit 702 converts the gloss data into inclined structure data representing a combination ratio of a plurality of recordable inclined structures by referring to an inclined structure table stored in an inclined structure table storing unit 711.

An inclined structure halftone processing unit 703 performs a halftone process using error diffusion method for inclined structure data and determines an inclined structure to be recorded among a plurality of inclined structures. In other words, by performing the halftone process for the inclined structure data, N-value quantization data having N=41 representing an inclined structure to be recorded among inclined structures 1 to 41 is generated.

The pattern data generating unit 704 generates pattern data (recording data relating to a gloss) representing the number of laminations of each recording pixel based on the quantization data by referring to a pattern profile stored in a pattern profile storing unit 712.

A color converting unit 705 converts color data (RGB) into color data (R', G', B') depending on a recording apparatus by referring to a color conversion table stored in a color conversion table 713.

A color separating unit 706 converts the color data (R', G', B') into color material data (C, M, Y, K) by referring to a color conversion table stored in a color separation table storing unit 714.

The color halftone processing unit 707 performs a halftone process for the color material data (C, M, Y, K) and generates binary data (C', M', Y', K') (recording data relating to colors) representing whether or not ink is discharged.

A pattern recording unit 708 performs lamination recording using the ink W. A color recording unit 709 performs recording using the ink C, M, Y, and K. An inclined face smoothing unit 710 performs recording using the ink S.

(Sequence of Image Processing)

Figure 8:
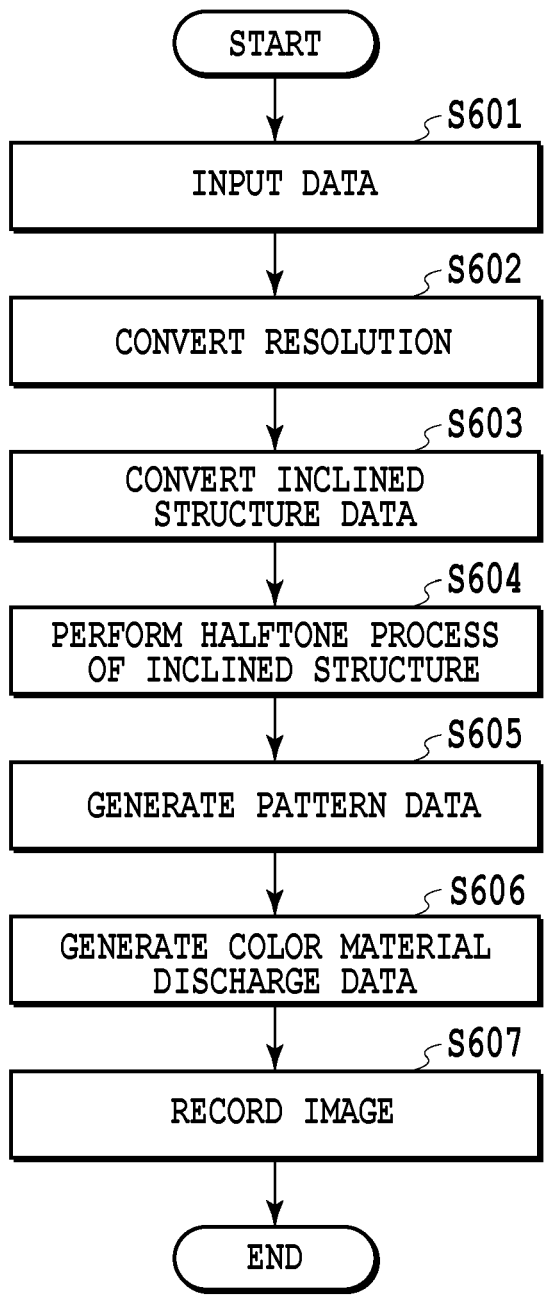
FIG. 8 is a flowchart that illustrates the sequence of image processing according to the first embodiment.

FIG. 8 is a flowchart that illustrates the sequence of image processing according to this embodiment.

In Step S601, the input unit 503 inputs image data including color data and gloss data. For example, in this embodiment, the color data includes three pieces of color data corresponding to RGB, and the gloss data includes a specular gloss and reflection haze. In the gloss data, the reflection haze relates to reflectivity for a direction deviating from the direction of specular reflection by several degrees, and it is necessary to control not only the strength of the gloss but also the angle characteristic (variable reflection characteristic) for the reproduction of the reflection haze.

In Step S602, the resolution converting unit 701 (gloss data acquiring unit) converts the resolution of the input image data. The color data is converted into the recording resolution of the image recording apparatus 400. The gloss data is converted into resolution having one inclined structure as one pixel. In this embodiment, as illustrated in FIG. 3B, in order to record an inclined structure of vertical four recording pixels×horizontal four recording pixels by using the image recording apparatus 400, the resolution of the gloss data is converted into ¼ of the recording resolution of the image recording apparatus 400. For example, in a case where the recording resolution of the image recording apparatus 400 is 720 dpi, the resolution of the gloss data is converted into 180 dpi.

In Step S603, the inclined structure data converting unit 702 converts the gloss data into inclined structure data representing a combination ratio of recordable inclined structures (for example, inclined structures 1, 2, . . . , 41). In this embodiment, an example will be described in which 41 kinds (the number of predetermined kinds) of inclined structures having inclined faces formed by a single plane are recorded.

Figure 9A:
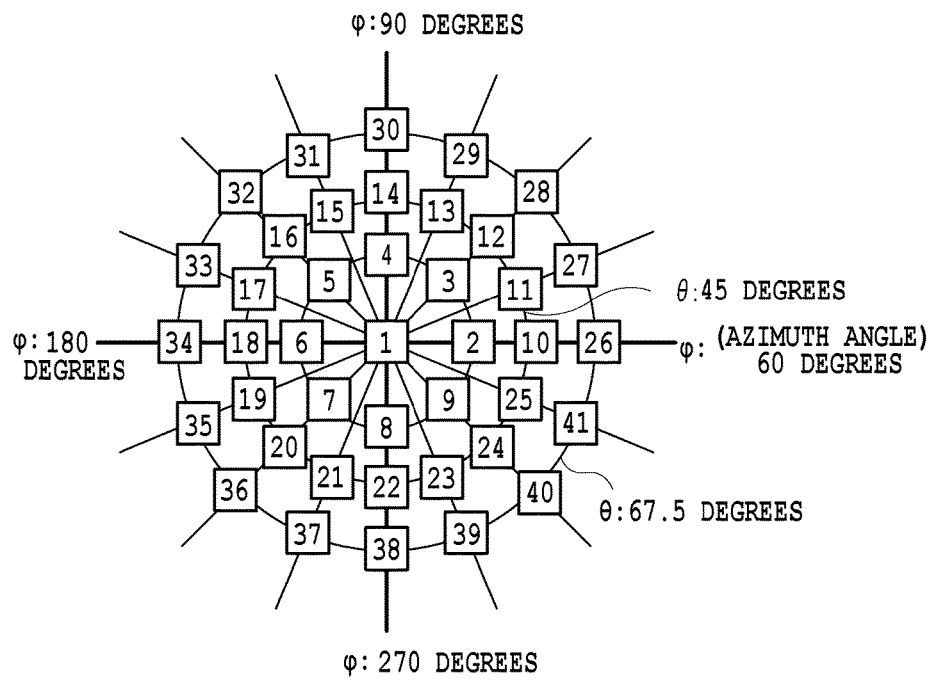
FIG. 9A is a schematic diagram that illustrates kinds of recordable inclined structures according to the first embodiment.
Figure 9B:
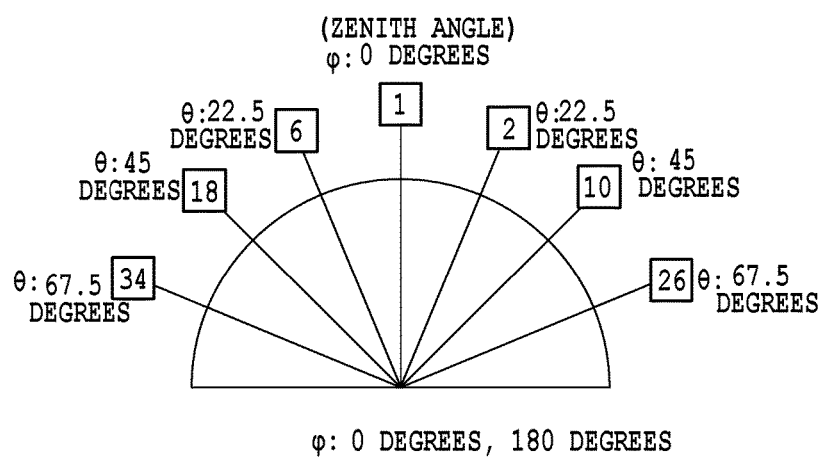
FIG. 9B is a schematic diagram that illustrates kinds of recordable inclined structures according to the first embodiment.

FIGS. 9A and 9B are schematic diagrams that illustrate kinds of recordable inclined structures according to this embodiment. In this embodiment, recordable inclined structures include an inclined structure 1 having a zenith angle of 0 at which the normal-line direction of the inclined face coincides with a plane normal line of a macro image recording medium. In addition, eight inclined structures 2 to 9 of which the zenith angles in the normal-line direction of the inclined face are 22.5 degrees and the azimuth angles are at the interval of 45 degrees are included therein. Furthermore, the recordable inclined structures include 32 inclined structures 10 to 41 of which the zenith angles in the normal-line direction of the inclined face are 45 degrees and 67.5 degrees and the azimuth angles are at the interval of 22.5 degrees. The inclined structure data is formed by 41 components corresponding to such inclined structures and represents a ratio of the component, and accordingly, a sum of values of all the components is one. The conversion of the gloss data into the inclined structure data is performed using a known lookup table (hereinafter, referred to also as a LUT) method referring to an inclined structure table.

FIG. 10 is a diagram that illustrates an example of an inclined structure table according to this embodiment. The inclined structure table is a table describing a correspondence relation between gloss data and inclined structure data. This table represents that a variable reflection characteristic represented by the gloss data is reproduced by recording inclined structures at a ratio of inclined structure data corresponding to the gloss data. For example, the inclined structure data corresponding to the gloss data (gloss_i, haze_i) is assumed to be data in which a component of the inclined structure 1 is 0.7, a component of the inclined structure 2 is 0.3, and the other components are 0. In other words, the inclined structure data is (0.7, 0.3, . . . 0). In such a case, it represents that the variable reflection characteristic corresponding to the gloss data can be reproduced by recording the inclined structure 1 in 70% of the area and recording the inclined structure 2 in the remaining 30% of the area.

In Step S604, the inclined structure halftone processing unit 703 performs a halftone process for the inclined structure data of each pixel and determines an inclined structure to be recorded among the inclined structures 1 to 41 for each pixel. The inclined structure halftone processing unit 703 generates 41-value quantization data representing one of the 41 kinds of inclined structures. In this embodiment, an example is described in which the quantization data is generated by a halftone process using an error diffusion method.

First, determination data is acquired by adding a sum of errors from peripheral pixels to the inclined structure data of a pixel of interest. Then, a value (for example, an inclined structure ID) representing the kind of inclined structure corresponding to one of components having a largest value is set as the quantization data of the pixel of interest. For example, in a case where the inclined structure data of the pixel of interest is (0.7, 0.3, . . . 0), and a sum of errors diffused from the peripheral pixels is (0, 0.6, . . . 0), the determination data is (0.7, 0.9, . . . 0). In such a case, an inclined structure ID (2) corresponding to a component having a largest value is set to the quantization data of the pixel of interest. In addition, the error of the pixel of interest is calculated. The error is a value acquired by subtracting inclined structure data corresponding to the set inclined structure ID from the determination data. In the example described above, inclined structure data corresponding to the set inclined structure ID is (0, 1, . . . 0). In this case, the error is (0.7, −0.1, . . . 0). This error is diffused to peripheral pixels of which quantization data is not generated.

Figure 11:
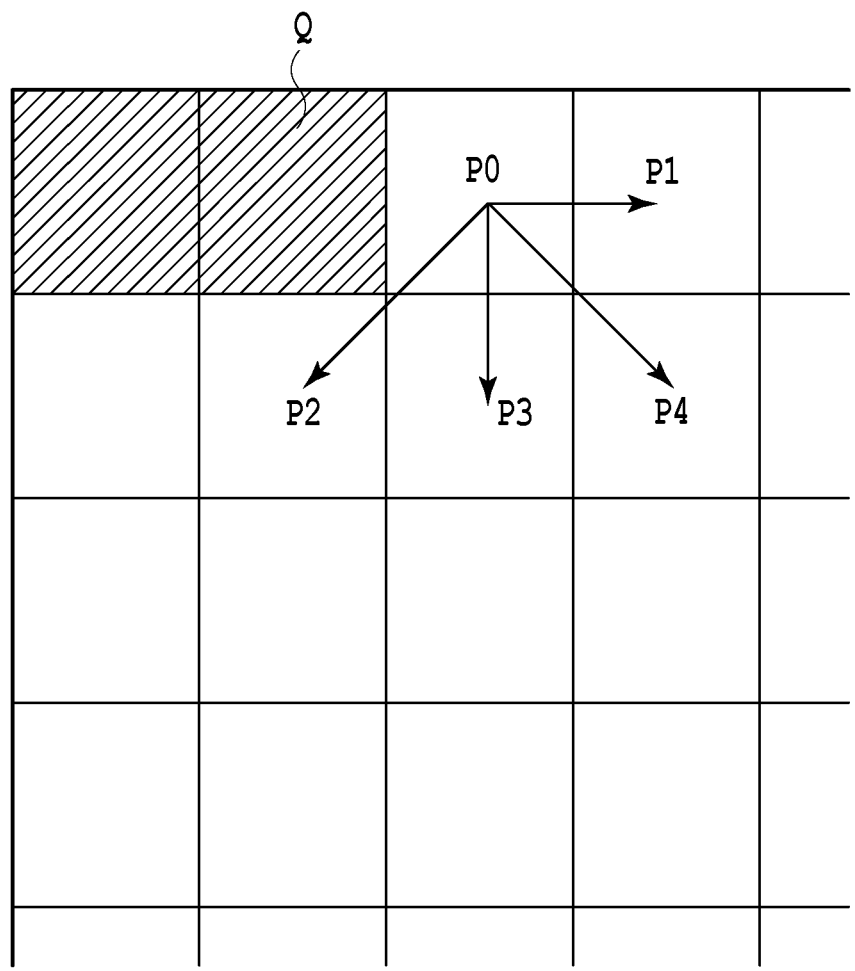
FIG. 11 is a schematic diagram that illustrates error diffusion according to the first embodiment.

FIG. 11 is a schematic diagram that illustrates error diffusion toward peripheral pixels. In the diagram, P0 represents a pixel of interest, and a shaded portion represents pixels of which quantization data has already been generated. The error of the pixel of interest P0 diffuses at a predetermined ratio into peripheral pixels P1, P2, P3, and P4 of which the quantization data has not been generated on the periphery of the pixel P0. For example, 7/16, 3/16, 5/16, and 1/16 of the error of the pixel P0 diffuse into the pixels P1, P2, P3, and P4.

As above, the halftone process of Step S604 is performed for all the pixels of the inclined structure data, whereby quantization data is generated.

In Step S605, the pattern data generating unit 704 generates pattern data (recording data relating to the gloss) based on the quantization data. The pattern data is image data with the recording resolution of the image recording apparatus 400 and is data representing the number of laminations for each recording pixel of the recording resolution of the image recording apparatus 400. More specifically, the pattern data is generated by replacing the inclined structure ID of each pixel of inclined structure arrangement data with the number of laminations data of vertical four recording pixels×horizontal four recording pixels by referring to the pattern profile. The pattern data is not limited to the data representing the number of laminations but may be data representing a height.

FIG. 12 is a diagram that illustrates an example of the pattern profile. The pattern profile is a table in which a correspondence relation between an inclined structure ID and the number of laminations data of vertical four recording pixels and horizontal four recording pixels for recording an inclined structure is described. In FIG. 12, (m, n) represents a vertical m-th recording pixel position and a horizontal n-th recording pixel position.

In Step S606, color material discharge data is generated based on the color data. The color material discharge data is data relating to the discharge of ink of colors C, M, Y, and K and is generated as below.

First, the color converting unit 705 converts the resolution-converted color data (R', G', B') into color data (R", G", B") depending on the recording apparatus by referring to the color conversion table. The color conversion table is a table describing color data (R", G", B") corresponding to discrete color data (R', G', B'), and the color data is converted using a known three-dimensional LUT method. According to this conversion, colors represented by the input color data are mapped into colors that can be reproduced by the image recording apparatus. It may be configured such that a plurality of color conversion tables corresponding to a minimum color difference, a saturation priority, a brightness priority, and the like are prepared, and tables to be used are switched in accordance with the purpose.

Next, the color separating unit 706 converts the color data (R', G', B') into the color material data (C, M, Y, K) relating to the amount of each color ink by referring to the color separation table. The color separation table is a table describing color material data (C, M, Y, K) corresponding to discrete color data (R', G', B'), and the color material data is converted using a known three-dimensional LUT method.

In Step S606, the color halftone processing unit 707 performs a halftone process based on image data configured by the color material data (C, M, Y, K) and generates color material discharge data configured by binary data (C', N', Y', K') representing whether or not ink is discharged. For example, the binary data (C', M', Y', K') represents discharge of ink in case of a value "1" and represents no discharge of ink in case of a value "0". For the halftone process performed by the color halftone processing unit 707, a known error diffusion method or a known systematic dithering method can be used.

In Step S607, an image is recorded on a recording medium based on the pattern data and the color material discharge data. First, the pattern recording unit 708 laminates the ink W based on the pattern data, thereby forming a lower base of the inclined structure. Next, the color recording unit 709 discharges ink of C, M, Y, and K based on the color material discharge data, and, finally, the inclined face smoothing unit 710 smooth the inclined face by discharging the ink S onto the whole image face.

As described above, the image recording apparatus according to this embodiment includes a conversion unit that converts gloss data relating to the variable reflection characteristic into inclined structure data representing a combination ratio of recordable inclined structures. Accordingly, arbitrary gloss data can be associated with a combination of a small number of inclined structures. Thus, the size of the inclined structure can be decreased, and a decrease in the resolution can be suppressed. The image recording apparatus according to this embodiment includes the halftone processing unit that determines an inclined structure to be recorded by performing the halftone process for the inclined structure data. Accordingly, many variable reflection characteristics can be reproduced without being limited to the kinds of inclined structures to be recorded.

Second Embodiment

In the first embodiment, an example has been described in which the error diffusion method is used for the inclined structure halftone process. Since the error diffusion method determines quantization data of a pixel to be processed later based on error data of a pixel that has been processed in advance, the processes of a plurality of pixels cannot be performed in parallel, and it takes time for the process. In this embodiment, an example will be described in which the processes of pixels can be performed in parallel by using a random number generator. Since the configuration other than an inclined structure halftone processing unit 703 is the same as that of the first embodiment, description thereof will not be presented.

(Inclined Structure Halftone Processing Unit)

The inclined structure halftone processing unit according to this embodiment generates quantization data by using a random number generator.

Figure 13:
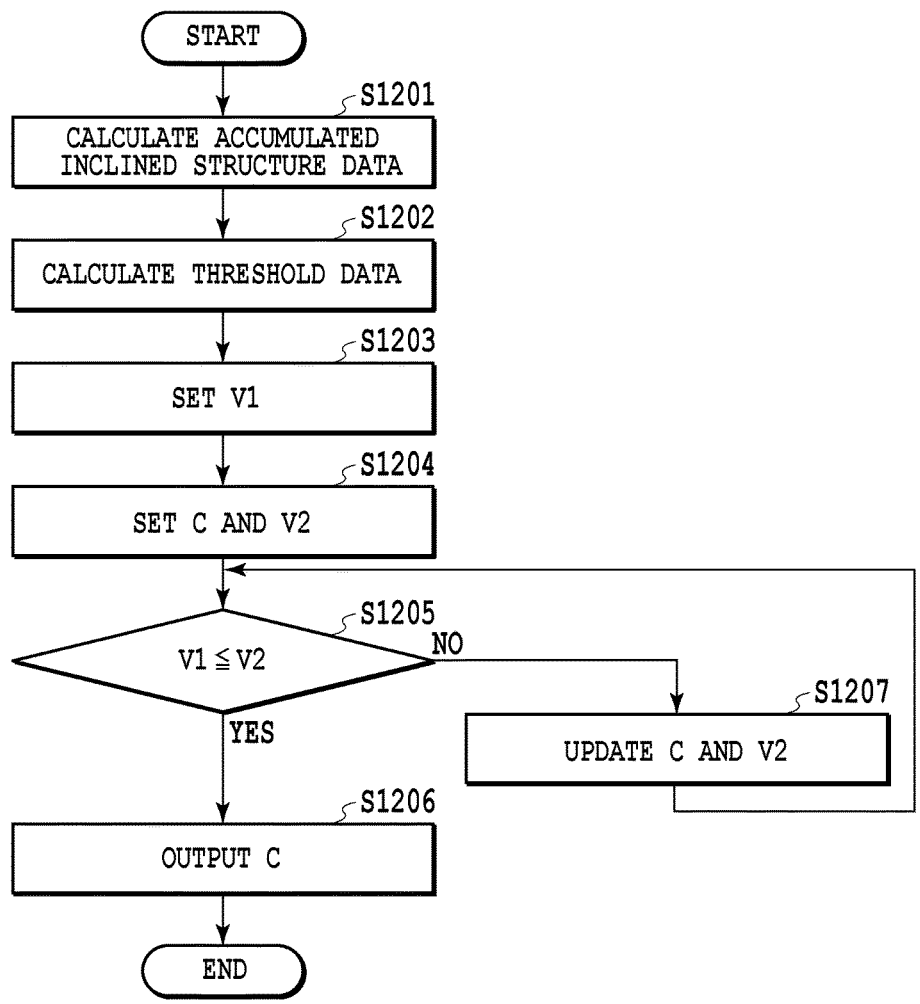
FIG. 13 is a flowchart that illustrates the sequence of an inclined structure halftone process according to a second embodiment.

FIG. 13 is a flowchart that illustrates the sequence of an inclined structure halftone process (Step S604 illustrated in FIG. 8) according to this embodiment.

In Step S1201, the inclined structure halftone processing unit 703 calculates accumulated inclined structure data based on inclined structure data of a pixel of interest. The accumulated inclined structure data, similar to the inclined structure data, has components corresponding to inclined structures 1 to 41 that can be recorded by the image recording apparatus 400, and the value of an n-th component of the accumulated inclined structure data is a total sum of the value of a first component to the value of an n-th component of the inclined structure data. For example, in a case where the inclined structure data is (0.5, 0.3, 0.2, . . . 0), the accumulated inclined structure data is (0.5, 0.8, 1, . . . 1).

In Step S1202, the inclined structure halftone processing unit 703 calculates threshold data based on the accumulated inclined structure data. The threshold data is data acquired by multiplying the value of each component of the accumulated inclined structure data by A that is a constant. Here, the constant A, for example, is 256. In such a case, when accumulated inclined structure group data is (0.5, 0.8, 1, . . . 1), the threshold data is (128, 205, 256, . . . 256).

In Step S1203, the inclined structure halftone processing unit 703 generates one integer value of "1" to the constant A by using the random number generator and sets the generated integer value to a variable V1. The random number generator used here is a random number generator that generates all the values at the same probability.

In Step S1204, the inclined structure halftone processing unit 703 sets a value (for example, an inclined structure ID) representing a kind of inclined structure corresponding to a first component of the threshold data to a variable C and sets the value of this component to a variable V2. For example, in a case where the threshold data is (128, 205, 256, . . . 256), "1" is set to the variable C, and 128 is set to the variable V2.

In Step S1205, the inclined structure halftone processing unit 703 compares the value of the variable V1 with the value of the variable V2. The process proceeds to Step S1206 in a case where the value of the variable V1 is equal to or less than the value of the variable V2 and, otherwise, proceeds to Step S1207.

In Step S1206, the inclined structure halftone processing unit 703 outputs the variable C as the quantization data of the pixel of interest, and the process of the pixel of interest ends.

In Step S1207, the inclined structure halftone processing unit 703 updates the values of the variable C and the variable V2, and the process is returned to Step S1205. More specifically, an inclined structure ID corresponding to a next component of the threshold data is set to the variable C, and the value of the component of the threshold data is set to the variable V2. For example, in a case where the value of the variable C before the process of Step S1207 is "1", in the process of this step, the value of the variable C is updated to "2", and the variable V2 is updated to 205.

According to the process described above, the generation of the quantization data of the pixel of interest can be performed independently from the process of any other pixel. Accordingly, by performing the processes of a plurality of pixels in parallel, the process can be performed at a high speed.

As described above, according to the image recording apparatus of this embodiment, the inclined structure halftone process can be performed in parallel for pixels, and the process can be performed at a high speed.

Third Embodiment

In the second embodiment, while an example has been described in which the random number generator is used for the inclined structure halftone process, in this embodiment, an example using a dithering method will be described. The configuration other than the inclined structure halftone processing unit is the same as that of the second embodiment, and thus, description thereof will not be presented.

(Inclined Structure Halftone Processing Unit)

An inclined structure halftone processing unit according to this embodiment generates quantization data using a dither matrix.

More specifically, as a constant A used for calculating threshold data in Step S1202, a total number of the cells of the dither matrix is used. For example, in a case where the size of the dither matrix is a total of 131072 cells of vertical 256 cells×horizontal 512 cells, 131072 is set to the constant A. In addition, in place of the value generated by the random number generator, the value of the dither matrix corresponding to a pixel of interest is set to the value of the variable V1 set in Step S1203. The other processing sequence is the same as that of the second embodiment.

FIG. 14 is a diagram that illustrates an example of the dither matrix used by the inclined structure halftone processing unit according to this embodiment. The dither matrix illustrated in FIG. 14 is configured by a total 256 of cells of vertical 16 cells×horizontal 16 cells, and one of integers of 1 to 256 is stored in each cell without any overlap. However, the size of the dither matrix is not limited thereto, but various sizes may be used. In case of a dither matrix of which the number of vertical cells is Dy, and the number of horizontal cells is Dx, one of integer values of 1 to Dy×Dx is stored in each cell without any overlap. For example, in case of a dither matrix of vertical 256 cells and horizontal 512 cells, integer values of 1 to 131072 are stored without any overlap. Preferably, the value stored in each cell of the dither matrix is set using a dot distribution-type systematic dither method represented by a Bayer dither matrix. In such a case, since pixels having a same inclined structure are set to be distributed, compared to the second embodiment, a recording image having good image quality from the viewpoint of a gloss noise can be acquired.

FIGS. 15A to 15C are schematic diagrams that illustrate a method of acquiring a value of a dither matrix corresponding to a pixel of interest in the inclined structure halftone processing unit according to this embodiment. In an image I configured by inclined structure data of vertical Iy pixels and horizontal Ix pixels, a block is set for every vertical Dy pixels×horizontal Dx pixel that are the size of the dither matrix D. Each block is represented to be partitioned using broken lines. In a block in which a pixel of interest Q is present, the dither matrix D is superimposed. The value of the dither matrix corresponding to the pixel of interest Q is the value of a cell of the dither matrix coinciding with the position of the pixel of interest Q in the block. More specifically, in a case where the position of an upper left pixel of the image I and the position of the upper left cell of the dither matrix D are set to O(0, 0), and the position of the pixel of interest in the image I is set to Q(Qx, Qy), the following is determined. When a remainder acquired by dividing Qx by Dx is Mx, and a remainder acquired by Qy by Dy is My, the value of the dither matrix corresponding to a pixel of interest is the value of a cell located at the position (Mx, My) of the dither matrix D. The value of the dither matrix acquired in this way is set to a variable V1 in Step S1203.

As described above, according to an image recording apparatus of this embodiment, high-speed processing can be performed without using a random number generator.

Fourth Embodiment

In this embodiment, a configuration will be described in which gloss data is directly converted into inclined structure arrangement data. A same reference numeral will be assigned to the same configuration as that of the first embodiment, and description thereof will not be presented.

Figure 16:
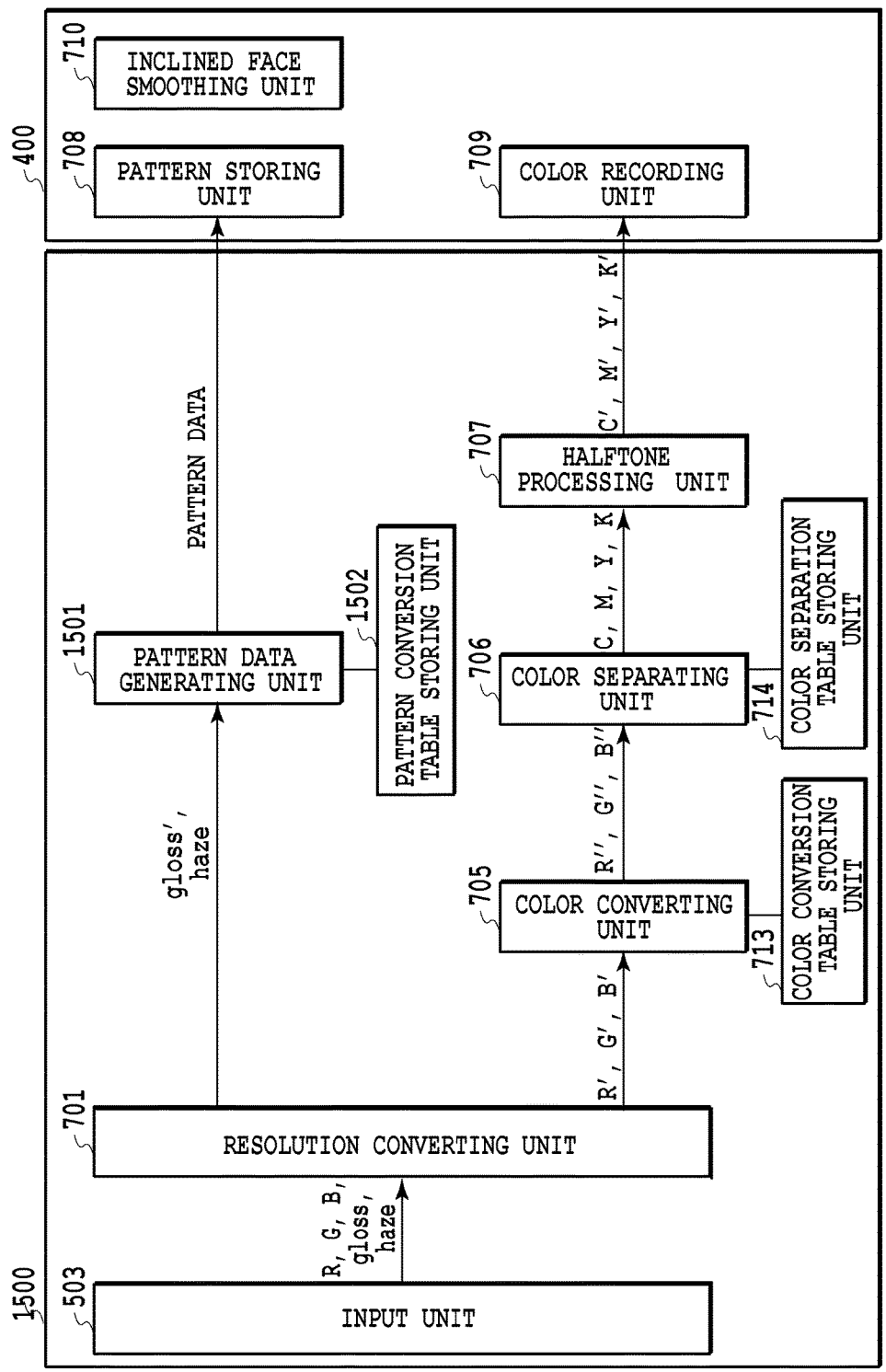
FIG. 16 is a block diagram that illustrates a functional configuration relating to image processing according to a fourth embodiment.

FIG. 16 is a block diagram that illustrates a functional configuration relating to image processing according to a fourth embodiment. In an image recording apparatus according to the fourth embodiment, a pattern data generating unit 1501 directly generates pattern data from gloss data of which the resolution is converted by a resolution converting unit 701. The pattern data generating unit 1501 acquires pattern data corresponding to the gloss data by referring to a pattern conversion table stored in a pattern conversion table storing unit 1502. The pattern conversion table is a table describing pattern data corresponding to all the gloss data that is considered.

The pattern conversion table can be generated by the inclined structure data converting unit 702, the inclined structure halftone processing unit 703, and the pattern data generating unit 704 according to the first embodiment. In other words, first, one data is selected from among the gloss data that is considered. Next, the selected gloss data is converted into inclined structure data by the inclined structure data converting unit 702. Next, the converted inclined structure data is converted into quantization data by the inclined structure halftone processing unit 703. In addition, the quantization data is converted into pattern data by the pattern data generating unit 704. A correspondence relation between the pattern data converted in this way and the gloss data is described in the pattern conversion table. By performing this process for all the gloss data that is considered, the pattern conversion table is generated.

The inclined structure halftone processing unit 703 performs a halftone process using error diffusion, and accordingly, the generated quantization data of the pixel of interest is influenced by an error diffusing from peripheral pixels. Thus, in the pattern conversion table, it is preferable that the gloss data is described in combination of a pixel of interest and peripheral pixels thereof. When such a pattern conversion table is referred to, pattern data is determined based on the gloss data of the pixel of interest and the peripheral pixels.

Figure 17:
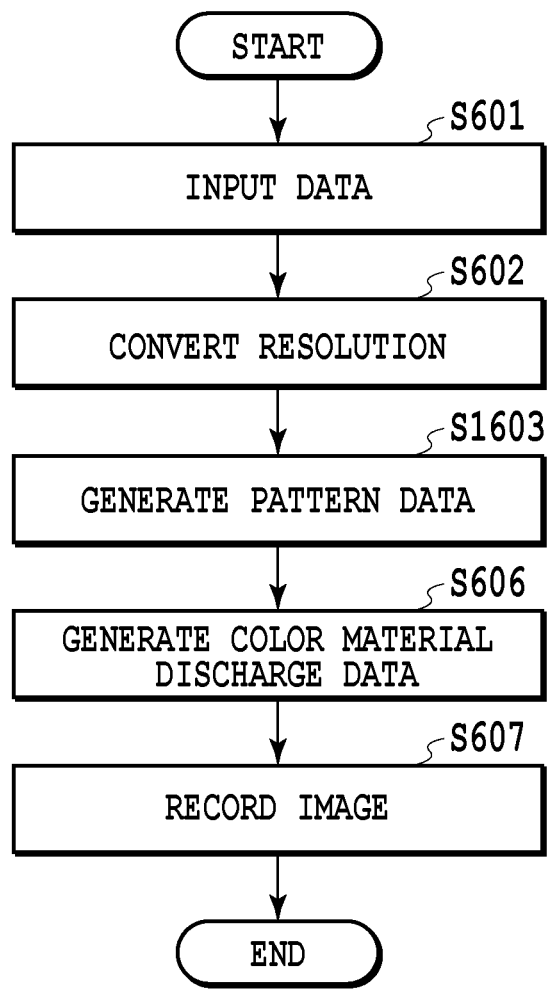
FIG. 17 is a flowchart that illustrates the sequence of image processing according to the fourth embodiment.

FIG. 17 is a flowchart that illustrates the sequence of image recording according to the fourth embodiment. Data is input in Step S601, and the resolution is converted in Step S602. Then, in Step S1603, pattern data is generated based on gloss data. Next, color material discharge data is generated in Step S606, and an image is recorded on a recording medium based on the pattern data and the color material discharge data in Step S607. Here, the process of Step S1603 is performed by the pattern data generating unit 1501.

(Verification Method)

Hereinafter, a method of verifying whether or not the pattern conversion table stored in the pattern conversion table storing unit 1502 is appropriate.

First, image data for verification will be described. First image data for verification is image data of which the resolution is ¼ of the recording resolution of the image recording apparatus and is data in which two areas including an area A formed by one pixel and an area B other than the area A are set. In the area A, gloss data corresponding to a gloss representing high image clarity of which the value of reflection haze is 10 or less and representing a zenith angle of 45 degrees as a direction having maximum reflectivity at the time of being lighted from a zenith angle of 0 degrees is set. In addition, in the area B, gloss data corresponding to a gloss representing high image clarity of which the value of reflection haze is 10 or less and representing a zenith angle of 0 degrees as a direction having maximum reflectivity at the time of being lighted from a zenith angle of 0 degrees is set. As other conditions, the same conditions are set for the area A and the area B.

Second image data for verification is image data of which the resolution is ¼ of the recording resolution of the image recording apparatus and is data in which two areas, of which the print size is 10 mm$^2$, including an area C and an area D are set. In the area C, gloss data corresponding to a gloss that represents high image clarity of which the value of reflection haze is 10 or less is set. In the area D, gloss data corresponding to a gloss that represents low image clarity of which the value of reflection haze is 50 or more is set. As other conditions, the same conditions are set for the area C and the area D.

The first image data is input to the image recording apparatus and surface pattern data of an output image is acquired. When the pattern conversion table is appropriately set, recording can be performed without decreasing the resolution, and accordingly, a difference of at least ten degrees or more occurs in an angle formed by an average of normal-line directions of the surfaces of areas corresponding to the area A and an average of normal-line directions of areas corresponding to the area B.

The second image data is input to the image recording apparatus and a value of the reflection haze of the output image is acquired. When the pattern conversion table is appropriately set, recording can be performed without decreasing the number of tone levels, and accordingly, a difference of at least ten degrees or more occurs in the value of the reflection haze of an area corresponding to the area C and the value of the reflection haze of an area corresponding to the area D.

According to the image recording apparatus of the fourth embodiment, by referring to the pattern conversion table describing a correspondence relation between the gloss data and the pattern data, a plurality of processes according to the first embodiment are realized by one conversion process. As a result, high-speed processing can be performed.

Other Embodiments

In the embodiments described above, while an example has been described in which gloss data configured by two types of data including a specular gloss and reflection haze is input, the gloss data is not limited to that of this example. Thus, the gloss data may be data relating to image clarity or data relating to a plurality of reflection hazes or image clarities. In addition, the gloss data may be data relating to reflectivity for each incidence direction or each reflection direction. Furthermore, the gloss data may be a parameter of a reflection model used for computer graphics. For example, a parameter of a Phong model, a Ward model, a Cook-Torrance model, or the like may be used. In such a case, an inclined structure table corresponding to the used gloss data is prepared. In addition, in the embodiments described above, while an example has been illustrated in which an inclined structure having an inclined face formed by a single plane is used, the inclined structure may be a structure formed by a plurality of planes or a structure formed by a curved plane. In such a case, an inclined structure table corresponding to the used inclined structure is prepared. In addition, in place of the inclined structure table, the inclined structure data may be configured to be calculated from the gloss data through optical calculation. Furthermore, the types of ink and the configuration of the image recording apparatus are not limited to the configurations of the embodiment. A configuration including a special color ink or a configuration using toner as a recording material may be employed. In addition, the size of the inclined structure or the recording sequence of the inclined structure is not limited to the configurations of the embodiment. A large inclined structure of ten recording pixels or more may be used, and a configuration in which, after colors are recorded, an inclined structure is recorded using a transparent recording material may be employed. In addition, in the embodiment described above, an example has been illustrated in which a ratio causing a sum of recordable inclined structures is one is used as the inclined structure data. However, the inclined structure data represents a combination ratio of inclined structures, and a sum of ratios of inclined structures may be the same for each gloss data. For example, data in which a sum of ratios of inclined structures is 100 or data in which a sum of ratios of inclined structures is 255 may be used.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a variable reflection characteristic of an image can be reproduced at high resolution and a high tone level.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-196914, filed Oct. 2, 2015, which is hereby incorporated by reference wherein in its entirety.

What is claimed is:

1. A recording data generating apparatus that generates recording data used for reproducing a gloss of an image by recording inclined structures on a recording medium, the recording data generating apparatus comprising:
   a conversion unit that converts gloss data with a first resolution having an inclined structure as one pixel into inclined structure data representing a combination ratio of a predetermined number of kinds of inclined structures;
   a halftone processing unit that generates N-value quantization data representing one of the predetermined number of kinds of inclined structures by performing a halftone process of the inclined structure data of each pixel with the first resolution, N being equal to the predetermined number of kinds; and
   a recording data generating unit that generates recording data used for recording one of the predetermined number of kinds of inclined structures for each pixel with the first resolution based on the quantization data.

2. The recording data generating apparatus according to claim 1, wherein the recording data is data with a second resolution that is recording resolution of an image recording apparatus recording an image by using the recording data and is data representing the number of laminations or a height of each pixel with the second resolution that represents a surface pattern of the image.

3. The recording data generating apparatus according to claim 2, wherein the second resolution is higher than the first resolution.

4. The recording data generating apparatus according to claim 2, further comprising a gloss data acquiring unit that acquires the gloss data with the first resolution by converting gloss data with a second resolution into the gloss data with the first resolution.

5. The recording data generating apparatus according to claim 1, wherein the halftone processing unit generates the quantization data by using an error diffusion method.

6. The recording data generating apparatus according to claim 1, wherein the halftone processing unit generates the quantization data by using a dithering method.

7. The recording data generating apparatus according to claim 1, wherein the halftone processing unit generates the quantization data by using a random number generator.

8. The recording data generating apparatus according to claim 1, wherein the conversion unit performs the conversion by referring to a lookup table describing a correspondence relation between discrete gloss data and the inclined structure data.

9. The recording data generating apparatus according to claim 1, wherein the gloss data includes data of reflection haze.

10. The recording data generating apparatus according to claim 1, wherein the gloss data includes data of image clarity.

11. The recording data generating apparatus according to claim 1, wherein the gloss data is data of a variable reflection characteristic.

12. The recording data generating apparatus according to claim 1, wherein the gloss data is a parameter of a reflection model.

13. The recording data generating apparatus according to claim 12, wherein the reflection model is a Ward model.

14. A recording data generating method generating recording data used for reproducing a gloss of an image by recording inclined structures on a recording medium, the recording data generating method comprising:
   converting gloss data with a first resolution having an inclined structure as one pixel into inclined structure data representing a combination ratio of a predetermined number of kinds of inclined structures;
   generating N-value quantization data representing one of the predetermined number of kinds of inclined structures by performing a halftone process of the inclined structure data of each pixel with the first resolution, N being equal to the predetermined number of kinds; and
   generating recording data used for recording one of the predetermined number of kinds of inclined structures for each pixel with the first resolution based on the quantization data.

15. A non-transitory computer readable storage medium storing a program for causing a computer to function as a recording data generating apparatus that reproduces a gloss of an image by recording inclined structures on a recording medium, the recording data generating apparatus comprising:
   a conversion unit that converts gloss data with a first resolution having an inclined structure as one pixel into inclined structure data representing a combination ratio of a predetermined number of kinds of inclined structures;
   a halftone processing unit that generates N-value quantization data representing one of the predetermined number of kinds of inclined structures by performing a halftone process of the inclined structure data of each pixel with the first resolution, N being equal to the predetermined number of kinds; and
   a recording data generating unit that generates recording data used for recording one of the predetermined number of kinds of inclined structures for each pixel with the first resolution based on the quantization data.

16. An image recording apparatus that records inclined structures on a recording medium by using recording data generated by a recording data generating apparatus generating the recording data used for reproducing a gloss of an image by recording the inclined structures on the recording medium, the recording data generating apparatus comprising:
   a conversion unit that converts gloss data with a first resolution having an inclined structure as one pixel into inclined structure data representing a combination ratio of a predetermined number of kinds of inclined structures;
   a halftone processing unit that generates N-value quantization data representing one of the predetermined number of kinds of inclined structures by performing a halftone process of the inclined structure data of each pixel with the first resolution, N being equal to the predetermined number of kinds; and a recording data generating unit that generates recording data used for recording one of the predetermined number of kinds of inclined structures for each pixel with the first resolution based on the quantization data.

* * * * *